United States Patent
Schaertel et al.

(10) Patent No.: US 8,879,129 B2
(45) Date of Patent: *Nov. 4, 2014

(54) METHOD OF CAPTURING AN IMAGE OF A DOCUMENT

(71) Applicant: Kodak Alaris Inc., Rochester, NY (US)

(72) Inventors: David M. Schaertel, Webster, NY (US); Nelson A. Blish, Rochester, NY (US); Daniel P. Phinney, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,885

(22) Filed: Dec. 14, 2012

(65) Prior Publication Data

US 2014/0168717 A1 Jun. 19, 2014

(51) Int. Cl.
  H04N 1/04 (2006.01)
  H04N 1/40 (2006.01)
  G06F 15/00 (2006.01)
  G06K 9/00 (2006.01)
  G03B 27/74 (2006.01)
  B65H 7/02 (2006.01)
  G10L 11/00 (2006.01)

(52) U.S. Cl.
  CPC .................................. *H04N 1/04* (2013.01)
  USPC ............ 358/474; 358/443; 358/1.9; 358/498; 382/112; 355/68; 271/258.01; 704/270

(58) Field of Classification Search
  USPC ................... 358/474, 443, 1.9, 498; 382/112; 355/68; 271/258.01; 704/270
  See application file for complete search history.

(56) References Cited

U.S. PATENT DOCUMENTS

| | | | | |
|---|---|---|---|---|
| 5,424,804 | A * | 6/1995 | Pultorak | 355/68 |
| 7,076,086 | B2 * | 7/2006 | Miyake et al. | 382/112 |
| 8,456,718 | B2 * | 6/2013 | Schaertel et al. | 358/498 |
| 8,472,092 | B2 * | 6/2013 | Schaertel et al. | 358/498 |
| 2003/0076518 | A1 * | 4/2003 | Miyake et al. | 358/1.9 |
| 2008/0013848 | A1 | 1/2008 | Wu et al. | |
| 2011/0238423 | A1 * | 9/2011 | Schaertel et al. | 704/270 |
| 2012/0019841 | A1 * | 1/2012 | Schaertel et al. | 358/1.9 |
| 2012/0019874 | A1 * | 1/2012 | Schaertel et al. | 358/474 |
| 2012/0044547 | A1 * | 2/2012 | Schaertel et al. | 358/498 |
| 2012/0044548 | A1 * | 2/2012 | Schaertel et al. | 358/498 |
| 2013/0093136 | A1 * | 4/2013 | Sakharshete et al. | 271/258.01 |
| 2013/0094065 | A1 * | 4/2013 | Pultorak | 358/443 |
| 2013/0094067 | A1 * | 4/2013 | Pultorak | 358/474 |

* cited by examiner

*Primary Examiner* — Charlotte M Baker
*Assistant Examiner* — Rury Grisham
(74) *Attorney, Agent, or Firm* — Hogan Lovells US LLP

(57) ABSTRACT

A document scanner (10) includes an input tray (30) for holding documents (20) and an input image capture device (40) for capturing images of the documents (20) in the input tray (30) prior to transporting the document for imaging; an output tray (150) for holding documents (20) after the documents (20) exit the scanner; an output image capture device (140) for capturing images of the output tray; an image processor for determining characteristics of the output tray or characteristic of the documents (20) before imaging and after the documents (20) exit the scanner; and scanner functions are modified based on the output tray characteristics or the document characteristics.

8 Claims, 3 Drawing Sheets

US 8,879,129 B2

METHOD OF CAPTURING AN IMAGE OF A DOCUMENT

CROSS REFERENCE TO RELATED APPLICATIONS

Reference is made to commonly-assigned copending U.S. patent application Ser. No. 13/714,863, filed Dec. 14, 2012, entitled VERIFYING ACCURACY OF A SCANNED DOCUMENT, by Schaertel et al.; U.S. patent application Ser. No. 13/714,901, filed Dec. 14, 2012, entitled SYSTEM FOR VERIFYING ACCURACY OF A RASTER SCANNED IMAGE OF A DOCUMENT, by Schaertel et al.; U.S. patent application Ser. No. 13/714,926, filed Dec. 14, 2012, entitled SYSTEM FOR CAPTURING AN IMAGE OF A DOCUMENT, by Schaertel et al.; U.S. patent application Ser. No. 12/858,488, filed Aug. 18,2010 (now U.S. Pat. No. 8,456,718 issued Jun. 4, 2013), entitled A DOCUMENT SCANNER, by Schaertel et al.; U.S. patent application Ser. No. 12/839,476, filed Jul. 20, 2010, entitled METHOD FOR DOCUMENT SCANNING, by Schaertel et al.; U.S. patent application Ser. No. 12/839,471, filed Jul. 20, 2010, entitled A DOCUMENT SCANNER, by Schaertel et al.; and U.S. patent application Ser. No. 12/276,641, filed Nov. 14, 2008 (now U.S. Pat. No. 7,828,279 issued Nov. 9, 2010), entitled DOCUMENT TRANSPORT APPARATUS, by Hammen; the disclosures of which are incorporated herein.

FIELD OF THE INVENTION

This invention relates to scanners in general, and in particular to verifying the accuracy of a scanned document.

BACKGROUND OF THE INVENTION

A document scanner moves a document through a transport path and creates a digital image of the document as it moves. The processor for the document scanner has preset document characteristics and the operator must select functions and features to accommodate the specific requirements for a particular type of document. Alternately, the scanner may default to less efficient settings that will process all documents since scanners are not typically programmed with specific requirements on a document-by-document basis.

The preset characteristics include document characteristics such as size, weight, texture; and specific application requirements such as resolution and imaging mode, color, simplex, or duplex. In a document scanner, the documents to be scanned may vary by size, weight, color content, physical condition, or other characteristics, which may require different scanner features to be enabled or operator actions to be employed for the most optimal and efficient mode of operation. Prior knowledge of these many different document attributes can enable the proper selection of scanner features to improve the efficiency of the scanning process or enable other features which may provide specific applications required by a particular type, style, or size of document. Prior knowledge of the documents physical condition can also prompt immediate action from the operator to protect the document or scanner or allow other features within the scanner to perform more reliably.

The exit area of the scanner is used for collecting the scanned documents as they exit the transport. A document must also exit the scanner, once it has been imaged, in an orderly fashion. By discerning document characteristics in the input area as well as the exit area, characteristics such as, but not limited to, number of documents, the exit area features which control stacking and tracking can be managed.

During the scanning process there are a number of ways in which the information extracted from a scanned document may be inaccurate. The scanned document may be deformed or wrinkled by the document transport system, there may be dust or foreign matter on the image capture optics, the document may be skewed or misaligned, or incorrect scanning features may have been selected, but not limited to, all of which may result in capture of inaccurate information during the scanning process. There exists a need to verify captured image data, especially in high speed document scanners.

There have been attempts in the document printing industry to verify information on printed images, but the requirements for printing a document are different than the requirements for accurate scanning of a document.

For example, U.S. Publication No. 2008/0013848, discloses a line-by-line scan of a printed document to check for defects such as streaks or banding in the printed document. U.S. Publication No. 2003/0076518, discloses a printer which incorporates a CCD raster capture device which images the output tray. The captured output image is compared to data used to print the document.

SUMMARY OF THE INVENTION

Briefly, according to one aspect of the present invention a method of capturing an image of a document includes providing an input tray for holding documents; capturing an image of a first document in the input tray with an input imaging device; wherein the input tray image of the document is captured as an area image; transmitting the captured input tray image of the document to an image processor; transporting the document to an output tray.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
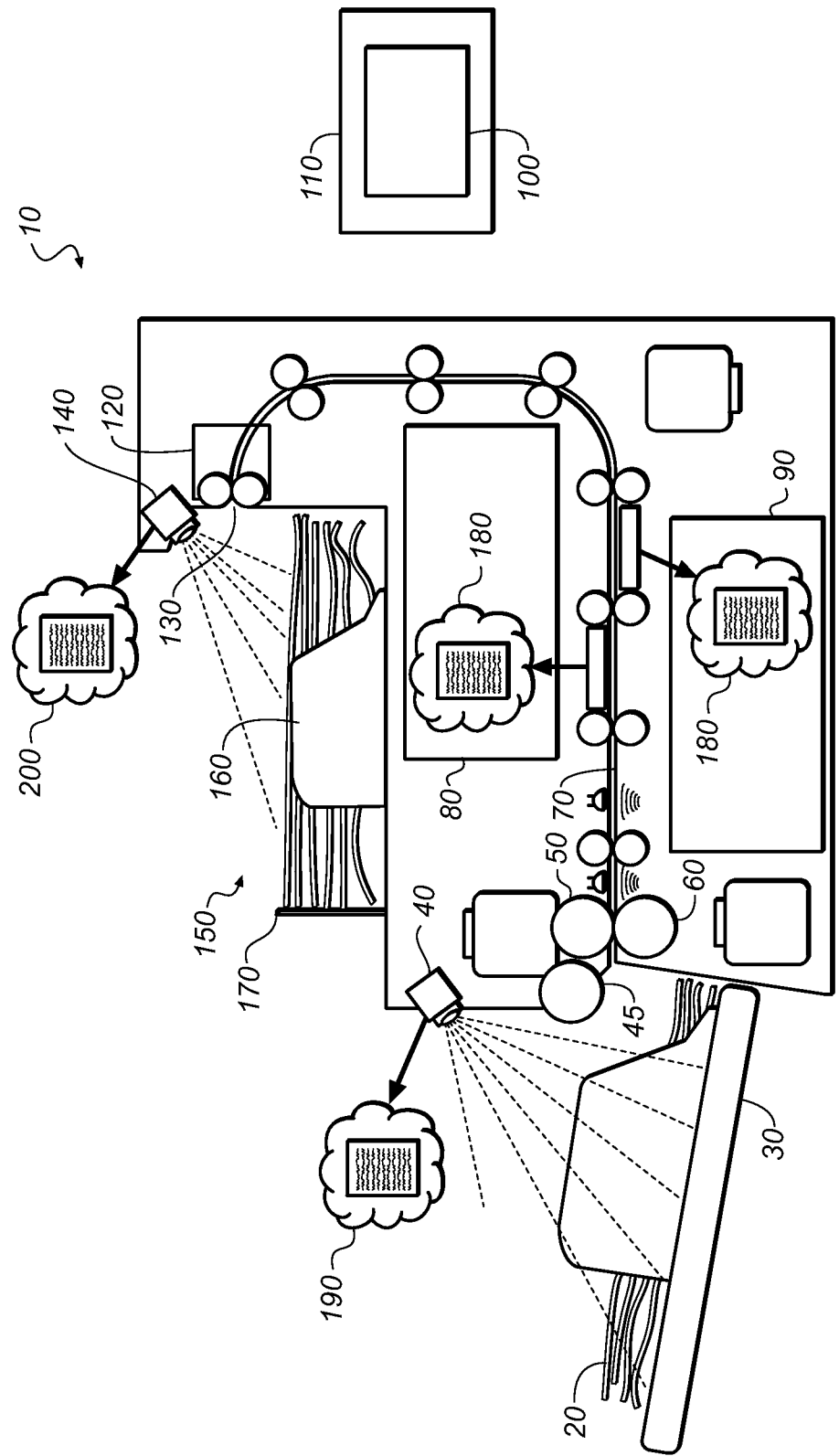
FIG. 1 is a cross-sectional view from the side of a transport for a document scanner according to the present invention.

FIG. 1 is a side cross-sectional view of a document scanner 10. As shown in FIG. 1, documents 20 are first placed in the input tray 30 of the scanner 10. The document is moved forward into the scanner 10 by the urging roller 45, then the feed roller 50 while additional documents 20 are held back by the separation roller 60. The document 20 continues through the document transport 70, is imaged by the front and rear raster capture devices 80 and 90 respectively, and then moves out of the transport exit 130 into the output tray 150.

As, or after, the document 20 exits the transport 70 at the transport exit 130, the document 20 and the output tray 150 are imaged by the output imaging device 140. The images are sent to the image processor 100 to discern document 20 and output tray 150 characteristics.

One output tray 150 characteristic is whether or not there are documents 20 present in the output tray 150. If the output tray 150 is determined to be empty the processor 110 will determine how many documents 20 can be scanned before the output tray 150 becomes full. Also determining the output tray 150 level of documents will be used by the processor 110 to stop scanning if the output tray 150 becomes full. This may happen if the operator continues to place documents 20 in the input tray 30 while scanning without removing documents (20) from the output tray 150.

Another important characteristic is the stacking of the documents 20 in the output tray 150. If the documents 20 are not laying flat, one on top of another, the processor 110 will stop the scanning process and prevent additional documents 20 from stacking improperly. Improper stacking may be an indication of the controlled output stacking 120 feature not operating properly or being inadvertently turned off. Based on the output tray 150 characteristics, proper adjustment of the output tray side guides 160 or end stop 170 will be determined. The scanning may be stopped for the operator to adjust the side guides 160 or end stop 170, or an auto adjust feature can be employed to make the correction while scanning is continued.

Figure 2:
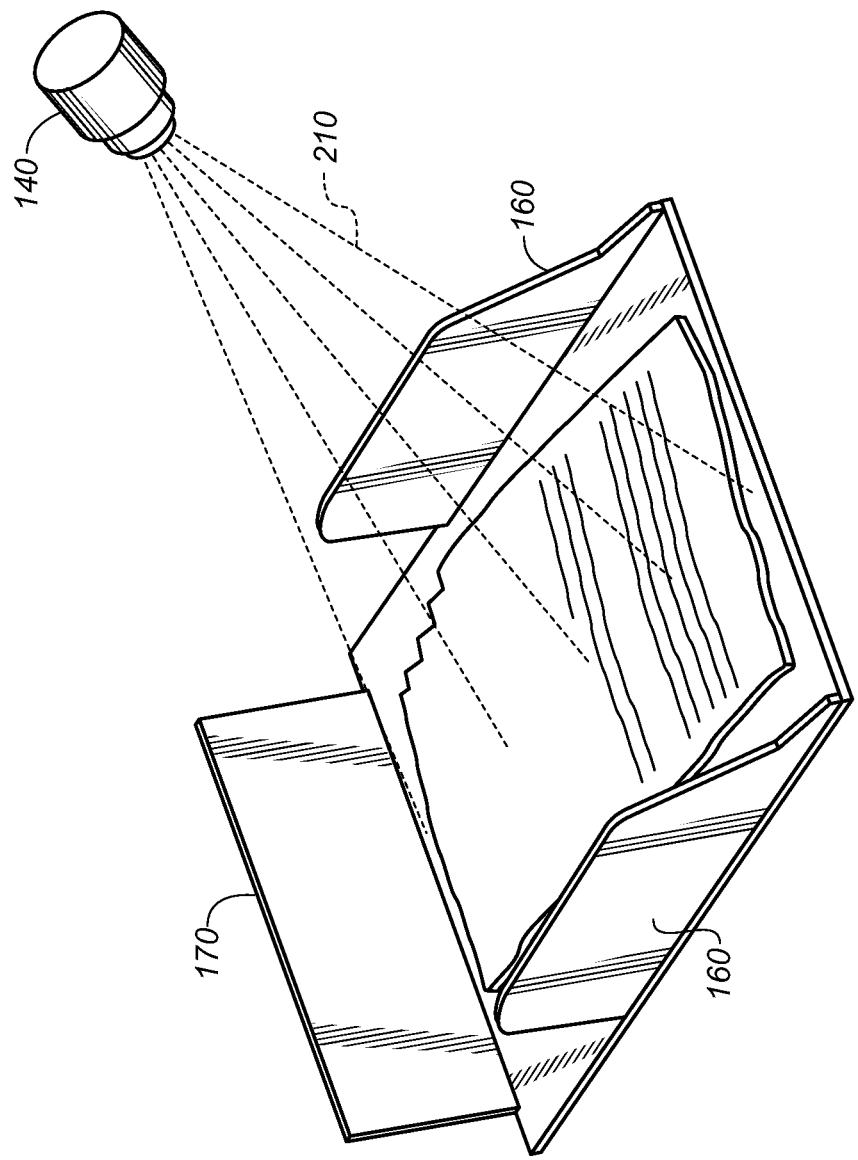
FIG. 2 is a perspective view of a scanner output tray according to the present invention.

Based on document information from an input imaging device 40 the condition of the document 20 exiting the scanner 10 will be compared to condition of documents 20 entering the scanner 10 to determine if damage to the document 20, such as bent or torn corners, is occurring within the document transport 70, as is shown in FIG. 2. The processor 110 will then stop the scanning process and alert the operator.

Using the information from the input imaging device 40 the number of documents 20 entering the document scanner 10 can be compared to the number of documents 20 exiting the scanner 10. If the number of documents 20 exiting the document scanner 10 does not match the number of documents 20 entering the document scanner 10 the operator will be alerted to the lost document 20.

Figure 3:
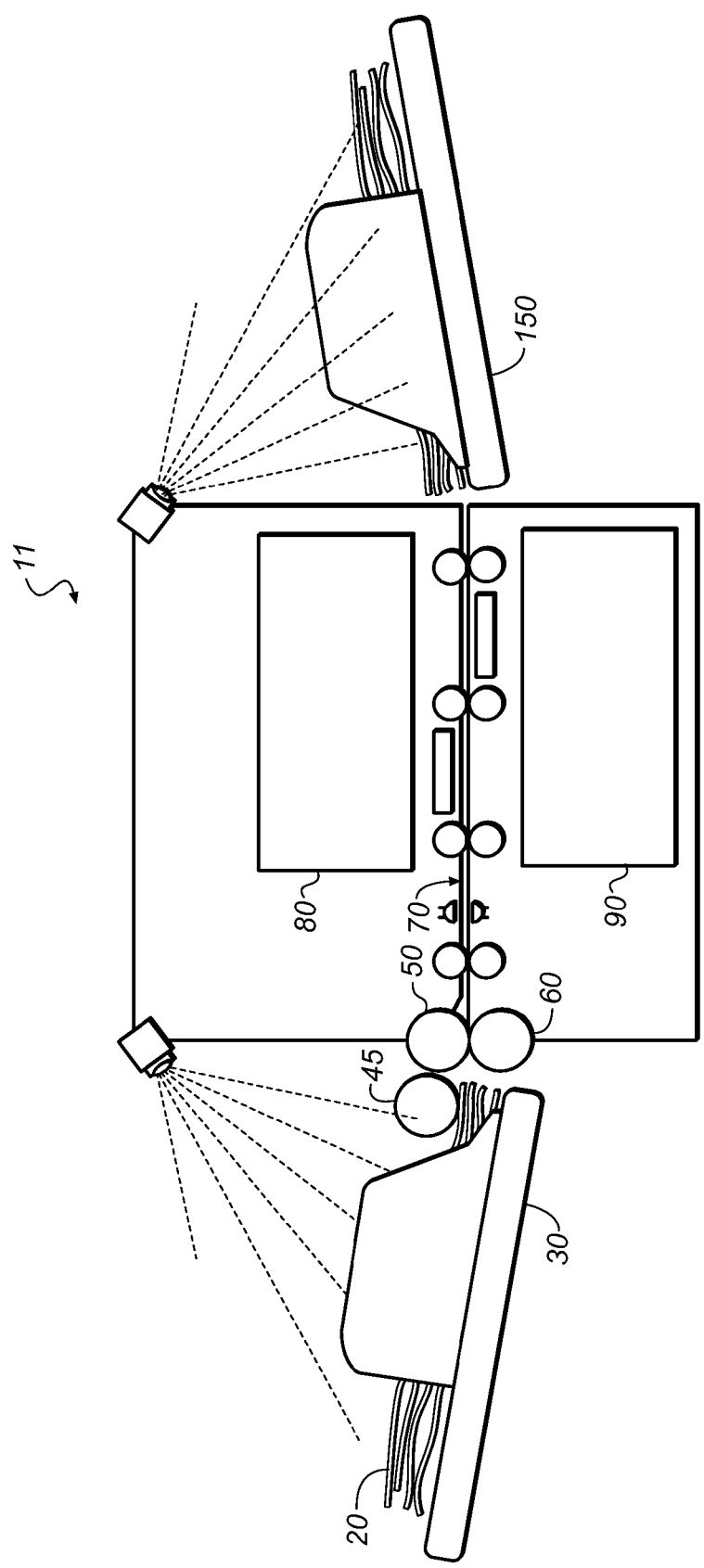
FIG. 3 is a cross-sectional view from the side of a straight through transport of a document scanner according to the present invention.

In a C-shape document transport 70 the document 20 order can be tracked using document 20 content captured by the output imaging device 140 in conjunction with the rear raster capture device 90. In document scanner 11, shown in FIG. 3, having a straight through document transport 70, the document 20 order can be tracked using the document 20 content captured by the output imaging device 140 in conjunction with the front raster capture device 80.

In one embodiment of the invention, an image of a document 20 in an input tray 30 is captured with an input imaging device 40 such as a raster capture device, CCD sensor, or CMOS sensor. The captured input tray image 190 is transmitted to an image processor 100 such as a microprocessor or a computer. The document is then transported through a document scanner 10 which captures a raster scanned image 180 of the document 20 and the raster scanned image 180 is transmitted to the image processor 100. The image processor 100 verifies the accuracy of the raster scanned image 180 by comparing the raster scanned image 180 of the document 20 to the input tray image 190 of the document 20. If the raster scanned image 180 of the document 20 does not match the input tray image 190 of the document 20, scanner 10 functions may be modified or other corrective actions taken. Corrective actions may include rotation of the raster capture device, changing a color capture mode, or cleaning image optics.

The input tray image 190 of the document 20 is captured as an area image 210 rather than raster by raster as is typically used to capture the raster scanned image 180 of the document 20. The input tray image 190 of the document 20 may be low resolution or high resolution.

In another embodiment of the invention, the document 20 is moved to an output tray 150 for holding documents 20 after it exits the scanner 10 and an image of the document 20 in the output tray 150 is captured with an output imaging device 140. The captured output tray 150 image is transmitted to the image processor 100 which verifies the accuracy of the raster scanned image 180 by comparing the raster scanned image 180 of the document 20 to the input tray image 190 of the document 20 and the output tray image 200 of the document 20.

In yet another embodiment of the invention, an image of a document 20 in an input tray 30 for holding documents 20 is captured as an area image 210 rather than raster by raster with an input imaging device 40. Capturing the image as an area image 210 means that an image of the entire document 20 is taken rather than imaging the document 20 raster by raster, which is the usual way of scanning a document 20. The captured input tray image 190 is transmitted to an image processor 100 and the document 20 is transported to an output tray 150. After the first document 20 has been transported out of the input tray 30, an image of a second document 20 in the input tray 30 is captured and transmitted to the image processor 100.

In a further embodiment, an image of the document 20 in the output tray 150 is captured with an output imaging device 140 and transmitted to the image processor 100. The accuracy of the input tray 30 image is verified by comparing the input tray image 190 of the document to the output tray image 200 of the document 20.

The invention has been described in detail with particular reference to certain preferred embodiments thereof, but it will be understood that variations and modifications can be effected within the scope of the invention.

Parts List 10 document scanner
11 document scanner
20 documents
30 input tray
40 input imaging device
45 urging roller
50 feed roller
60 separation roller
70 document transport
80 front raster capture device
90 rear raster capture device
100 image processor
110 processor
120 controlled output stacking
130 transport exit
140 output imaging device
150 output tray
160 output tray side guides
170 end stop
180 raster scanned image
190 input tray image
200 output tray image
210 area image

The invention claimed is:

1. A method of capturing an image of a document comprising:
    providing an input tray for holding documents;
    capturing an image of a first document in the input tray with an input imaging device;
    wherein the input tray image of the document is captured as an area image;
    transmitting the captured input tray image of the document to an image processor;
    transporting the document to an output tray.

2. The method as in claim 1 comprising:
    capturing an image of the document in the output tray with an output imaging device;
    transmitting the captured output tray image of the first document to the image processor; and
    verifying the accuracy of the input tray image of the document by comparing the input tray image of the document to the output tray image of the document.

3. The method as in claim 1 comprising:
    capturing an image of a second document in the input tray with the input imaging device;
    wherein the input tray image of the second document is captured as an area image;
    transmitting the captured input tray image of the second document to the image processor; and
    verifying the accuracy of the input tray image of the second document by comparing the input tray image of the second document to the output tray image of the second document.

4. The method as in claim 2 comprising:
    modifying scanner functions if the raster scanned image of the document does not match the input tray image of the document.

5. The method as in claim 4 wherein the scanner functions are selected from a group consisting of rotation of the raster capture device, changing a color capture mode, or cleaning image optics.

6. The method as in claim 1 wherein the input tray image of the document is high resolution.

7. The method as in claim 2 comprising:
    alerting a document scanner operator if the raster scanned image of the document does not match the input tray image of the document.

8. A method of verifying accuracy of a raster scanned image of a document comprising:
    transporting the document through a document scanner;
    capturing a raster scanned image of the document with a raster capture device;
    transmitting the raster scanned image to an image processor;
    providing an output tray for holding documents;
    capturing an image of a document in the output tray with an output imaging device;
    transmitting the captured output tray image to the image processor; and
    verifying the accuracy of the raster scanned image by comparing the raster scanned image of the document to the output tray image of the document.

* * * * *